US008423051B2

United States Patent
Yuan (10) Patent No.: US 8,423,051 B2
(45) Date of Patent: Apr. 16, 2013

(54) METHOD AND SYSTEM FOR IMPROVING PERFORMANCE OF A POSITIONING SYSTEM DURING A CONTINUOUS POSITIONING PROCESS

(75) Inventor: Jun Yuan, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 187 days.

(21) Appl. No.: 13/055,743

(22) PCT Filed: Sep. 22, 2009

(86) PCT No.: PCT/CN2009/074121
§ 371 (c)(1),
(2), (4) Date: Jan. 25, 2011

(87) PCT Pub. No.: WO2010/075707
PCT Pub. Date: Jul. 8, 2010

(65) Prior Publication Data
US 2011/0117936 A1   May 19, 2011

(30) Foreign Application Priority Data
Dec. 31, 2008   (CN) .......................... 2008 1 0241978

(51) Int. Cl.
*H04W 68/00*   (2009.01)
(52) U.S. Cl.
USPC .................. 455/456.5; 455/456.1; 455/456.2; 455/456.3; 455/457
(58) Field of Classification Search .............. 455/456.1, 455/456.2, 456.3, 456.4, 456.5, 456.6, 457
See application file for complete search history.

(56) References Cited

U.S. PATENT DOCUMENTS

| | | | |
|---|---|---|---|
| 2006/0258369 A1* | 11/2006 | Burroughs et al. | 455/456.1 |
| 2007/0004429 A1* | 1/2007 | Edge et al. | 455/456.1 |
| 2007/0167177 A1 | 7/2007 | Kraufvelin | |
| 2008/0125152 A1 | 5/2008 | Hou | |

FOREIGN PATENT DOCUMENTS

| | | |
|---|---|---|
| CN | 1602079 A | 3/2005 |
| CN | 1602080 A | 3/2005 |
| CN | 101478718 A | 7/2009 |
| JP | 11266476 A | 9/1999 |

(Continued)

OTHER PUBLICATIONS

International Search Report dated Dec. 31, 2009 corresponding to International Patent Application No. PCT/CN2009/074121 6 pages.
English translation of the Written Opinion dated Dec. 31, 2009 corresponding to International Patent Application No. PCT/CN2009/074121—5 pages.

(Continued)

*Primary Examiner* — Kamran Afshar
*Assistant Examiner* — Sayed T Zewari
(74) *Attorney, Agent, or Firm* — Maier & Maier PLLC (57) ABSTRACT

A method and system for improving performance of a positioning system during a continuous positioning process. The method is applied in a mobile communication positioning system, and mainly comprises the following steps: during the continuous positioning process, a mobile positioning center sends a mobile station state inquiring request to a home location register, the home location register receives the request and returns a mobile station current state response, the mobile positioning center performs positioning process or terminates positioning process to the mobile station based on the current state of the station. The present method can avoid circumstances where the continuous positioning has terminated while the positioning center and the positioning entity fails to release resources in time. Also, it can continuously track a subscriber in special industrial application, which avoids the circumstance of inability to continue previous continuous positioning after restart of a subscriber terminal.

10 Claims, 5 Drawing Sheets

FOREIGN PATENT DOCUMENTS

| | | |
|---|---|---|
| JP | 2000036979 A | 2/2000 |
| JP | 2008546343 A | 12/2008 |
| KR | 100723690 B1 | 5/2007 |
| RU | 2255433 C2 | 6/2005 |
| RU | 2337486 C2 | 10/2008 |
| WO | 2007083200 A1 | 7/2007 |

OTHER PUBLICATIONS

International Search Report dated Dec. 31, 2009 corresponding to International Patent Application No. PCT/CN2009/074121 and English translation thereof, 6 pages.

\* cited by examiner

METHOD AND SYSTEM FOR IMPROVING PERFORMANCE OF A POSITIONING SYSTEM DURING A CONTINUOUS POSITIONING PROCESS

RELATED APPLICATIONS

This is the U.S. national stage application which claims priority, under 35 U.S.C. §119, to International Patent Application No.:PCT /CN2009/074121, filed on Sep. 22, 2009, which claims priority to Chinese Patent Application No.: 200810241978.1, filed on Dec. 31, 2008, the disclosures of which are incorporated herein in their entireties.

TECHNICAL FIELD

The present invention relates to the field of a mobile communication network, and particularly relates to a method and system for improving performance of a positioning system during a continuous positioning process.

BACKGROUND

Location based services (LBS for short) are also called mobile location services or positioning services, which mean that a mobile network obtains geographical location information (latitude and longitude coordinates) of a mobile terminal via a specific positioning technology, provides the information to a mobile subscriber per se, a communication system, or a third party, and then provides location-related call or non-call services to the mobile subscriber with certain support of electronic map information.

Positioning manners of a mobile communication network comprise cell-based positioning, traditional GPS-based (global positioning system, GPS for short) positioning, AFLT-based (advanced forward link trilateration, AFLT for short) positioning, and AGPS (assisted GPS) positioning, etc., wherein the AGPS positioning, which combines GPS positioning and a mobile communication system, has been widely applied due to its fast positioning speed and high positioning accuracy.

Figure 1:
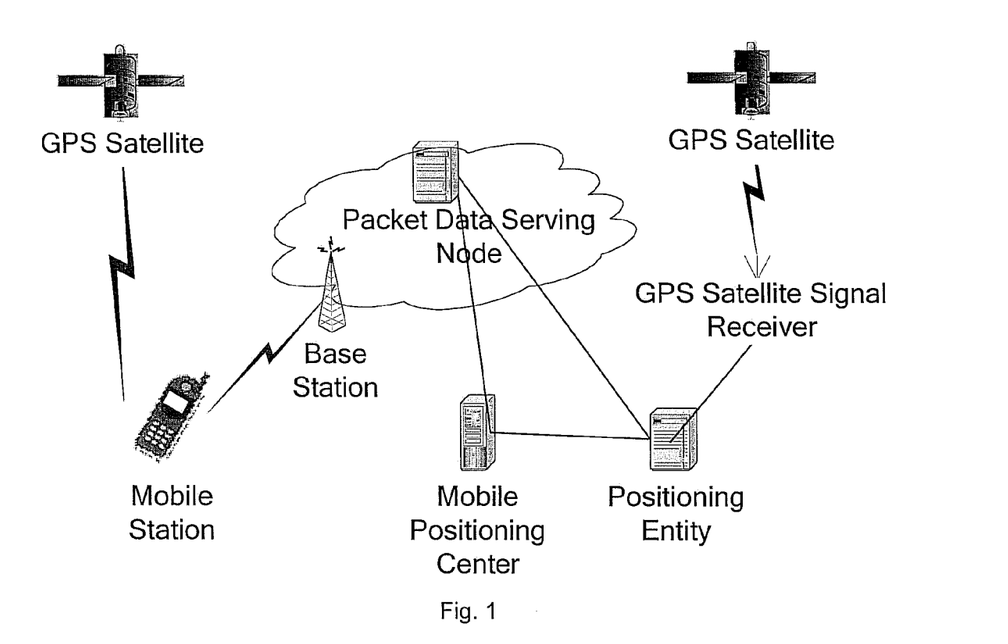
FIG. 1 is an entity architecture diagram of an AGPS positioning system.

FIG. 1 shows an entity architecture diagram of an AGPS-based positioning system of a mobile communication network system subscriber. The positioning system mainly comprises a mobile station, a mobile positioning center, a positioning entity, a GPS satellite signal receiver, and a GPS satellite, wherein the mobile station is a user end equipment of the positioning services, and its main function is to provide measurement information related to mobile terminal positioning, implement signaling interactions with the positioning entity via the mobile communication network, and accomplish a part of applications of the positioning services. The mobile station may also download auxiliary data from the positioning entity and implement location calculation, which is determined by a mobile station chip.

The mobile positioning center is a core entity for implementing the positioning services, and its main function is to control a positioning process, interact with each positioning entity, and store and provide subscriber location information, etc.

The main function of the positioning entity is to process information sent from the mobile station to a network side, and based on the base station geographic location information and GPS satellite data which are managed by the positioning entity, to calculate the location of the mobile terminal or provide the auxiliary data required for measurement for the mobile station, the auxiliary data includes the auxiliary data for searching the GPS satellite and base station geographic location information data for calculating location.

The main function of the GPS satellite signal receiver is to receive GPS satellite signal data and send the data to the positioning entity.

The function of the GPS satellite is to send real-time satellite signal data.

The current positioning methods may refer to the industrial standards "technical specifications on user plane-related devices for 800 MHz CDMA digital cellular mobile communication network V2 positioning services" and "specifications on mobile stations for China Unicom CDMA1X digital cellular mobile communication network" released by China Unicom, the industrial standard "specifications on China Telecom CDMA network positioning services devices" released by China Telecom, and the international standard "ANSI TIA/EIA-IS-801 position determination service standard for dual mode separate spectrum systems", wherein the CDMA is code division multiple access.

However, the continuous positioning flow in an existing network fails to consider abnormal situations of power off or restart of the mobile station during the positioning process.

Figure 2:
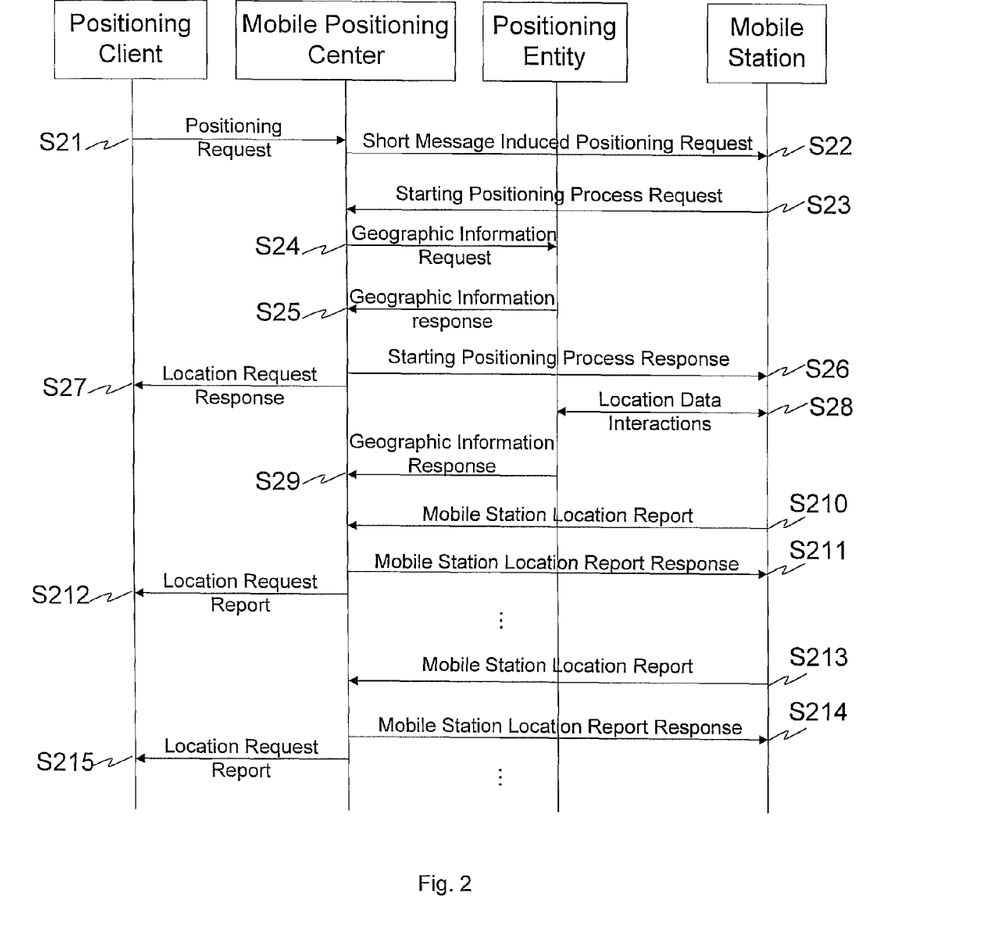
FIG. 2 is a flowchart illustrating track positioning initiated from a network side in an existing network.

FIG. 2 is a flowchart illustrating a track-type continuous positioning process initiated from a network side in an existing network, and the process comprises the following steps:

step S21, a positioning client initiates a positioning request for a mobile station to a mobile positioning center, and requests to perform a track-type continuous positioning for the mobile station;

step S22, the mobile positioning center sends a short message induced positioning request to the mobile station;

step S23, the mobile station initiates a starting positioning process request;

step S24, the mobile positioning center selects a corresponding positioning entity and sends a geographic location information request to the positioning entity;

step S25, the positioning entity returns a geographic location information response message to the mobile positioning center, and indicates that the positioning may be started;

step S26, the mobile positioning center returns a starting positioning request response to the mobile station, and indicates an IP address and a port number of the positioning entity;

step S27, the mobile positioning center assigns a task identification for this positioning and returns a location request response to the positioning client;

step S28, the mobile station performs location data interactions with the positioning entity, and downloads auxiliary positioning data, etc.;

step S29, the positioning entity, after completing final location calculation, sends a geographic location result to the mobile positioning center;

step S210, the mobile station sends a location report to the mobile positioning center;

step S211, the mobile positioning center returns a location report response to the mobile station;

step S212, the mobile positioning center sends the location result of the mobile station to the positioning client;

step S213, after a while, the mobile station obtains current wireless cell parameters, and sends a location report containing cell information to the mobile positioning center;

step S214, the mobile positioning center returns a location report response to the mobile station; and step S215, the mobile positioning center sends the location result of the mobile station to the positioning client.

In the continuous flow of the existing network, for the mobile positioning center and the positioning entity, once the track positioning starts, the continuous positioning flow will not be terminated and the resource will not be released until the time for terminating tracking arrives. However, in practical application, circumstances of power off or restart of the mobile station occur frequently during the continuous positioning process, and in such cases, the mobile station will not continue interacting with the positioning entity or send the location result to the mobile positioning center, and in fact at this point, the continuous positioning flow has terminated. It will cause the following consequences:

firstly, the resources of the mobile positioning center and the positioning entity cannot be released in time, which reduces performance of the positioning system and efficient utilization of resources; and secondly, in some special application circumstances (for example, logistic tracking for major businesses, tracking of a security department to some mobile stations), after the mobile station state resumes normal, the positioning client cannot timely and effectively obtain the latest location of the mobile station.

SUMMARY

The technical problem to be solved by the present invention is to provide a method and a mobile communication positioning system for improving performance of a positioning system during a continuous positioning process, which can constantly and timely track a mobile station in various circumstances, and the method is used for continuing tracking the mobile station after power off or restart of the mobile station.

In order to achieve the above-mentioned objective, the present invention provides a method for improving performance of a positioning system during a continuous positioning process, which is applied in a mobile communication positioning system comprising a positioning client, a mobile positioning center, a home location register, a positioning entity, and a mobile station, wherein the method comprises:

during the continuous positioning process, the mobile positioning center sends a mobile station state inquiring request to the home location register, the home location register receives the inquiring request and returns a mobile station current state response message, and the mobile positioning center performs positioning process or terminates positioning process to the mobile station based on the current state of the mobile station.

In order to achieve the above-mentioned objective, the present invention further provides a mobile communication positioning system.

The mobile communication positioning system according to the present invention comprises: a mobile positioning center, which is used for during a continuous positioning process, sending a mobile station state inquiring request to a home location register, and performing positioning process or terminating positioning process to the mobile station based on a current state of the mobile station which is included in a mobile station current state response message returned from the home location register; and the home location register, which is used for receiving the inquiring request and returning the mobile station current state response message.

Compared with the existing technology, the present invention possesses the following advantageous effects:

addition of a positioning flow after power off or restart of the mobile station can effectively reduce resource occupation of the mobile positioning center and the positioning entity, and continuing tracking is enabled after the state of the mobile station resumes normal, thus it is guaranteed that the positioning client can timely obtain the latest position of the mobile station.

Hereinafter, the present invention will be described in detail with reference to the drawings and the embodiments, which, however, shall not be limitation to the present invention.

DETAILED DESCRIPTION

Hereinafter, a method for improving performance of a positioning system will be described by taking track positioning for example.

A method for improving performance of a positioning system during a continuous positioning process according to the present invention mainly comprises the following steps:

step 1, during the continuous positioning process, when a mobile positioning center has not obtained a location result reported by a mobile station for a long time, the mobile positioning center terminates the previous continuous positioning and sends a cancelling positioning request to a positioning entity;

step 2, the mobile positioning center determines whether it is necessary to continue performing track positioning based on authorities of a positioning client and a calling subscriber, if not, resources are released and the flow is over; and if yes, a request is sent to a home location register to inquire the current state of the mobile station;

step 3, when the result returned from the home location register shows that the mobile station is currently in an abnormal state, the mobile positioning center continues sending a request to the home location register to inquire the current state of the mobile station after a certain time interval until the time for terminating tracking arrives or the state of the mobile station resumes normal; and step 4, when the result returned from the home location register shows that the mobile station is currently in a normal state, the mobile positioning center resends a short message induced positioning request to the mobile station so as to continue a new continuous positioning, it is unnecessary to send a location request response to the positioning client during the new continuous positioning process, but it is necessary to report an obtained location result to the positioning client.

In the above-mentioned method for improving the performance of the positioning system during the continuous positioning process, step 1 further comprises: the long time may be determined by a predefined time or obtained by a time interval during this continuous positioning multiplied by a certain factor.

In the above-mentioned method for improving the performance of the positioning system during the continuous positioning process, step 2 further comprises: when the mobile positioning center terminates positioning, if it is necessary to continue performing track positioning, the start and end time of this continuous positioning, the tracking time interval, the identification of the positioning client which initiates a positioning request, the identification of the calling subscriber which initiates a positioning request, the identification of the mobile station which is tracked and positioned, and the task identification for this continuous positioning must be recorded.

In the above-mentioned method for improving the performance of the positioning system during the continuous positioning process, step 3 further comprises: when the mobile station is power off, the mobile positioning center needs reporting a positioning result (the result message indicates positioning failure) to the positioning client based on the tracking time interval in this continuous positioning request.

In the above-mentioned method for improving the performance of the positioning system during the continuous positioning process, step 4 further comprises: when the mobile positioning center reports the result to the positioning client, the result must include the task identification for the continuous positioning recorded in step 2.

Figure 3:
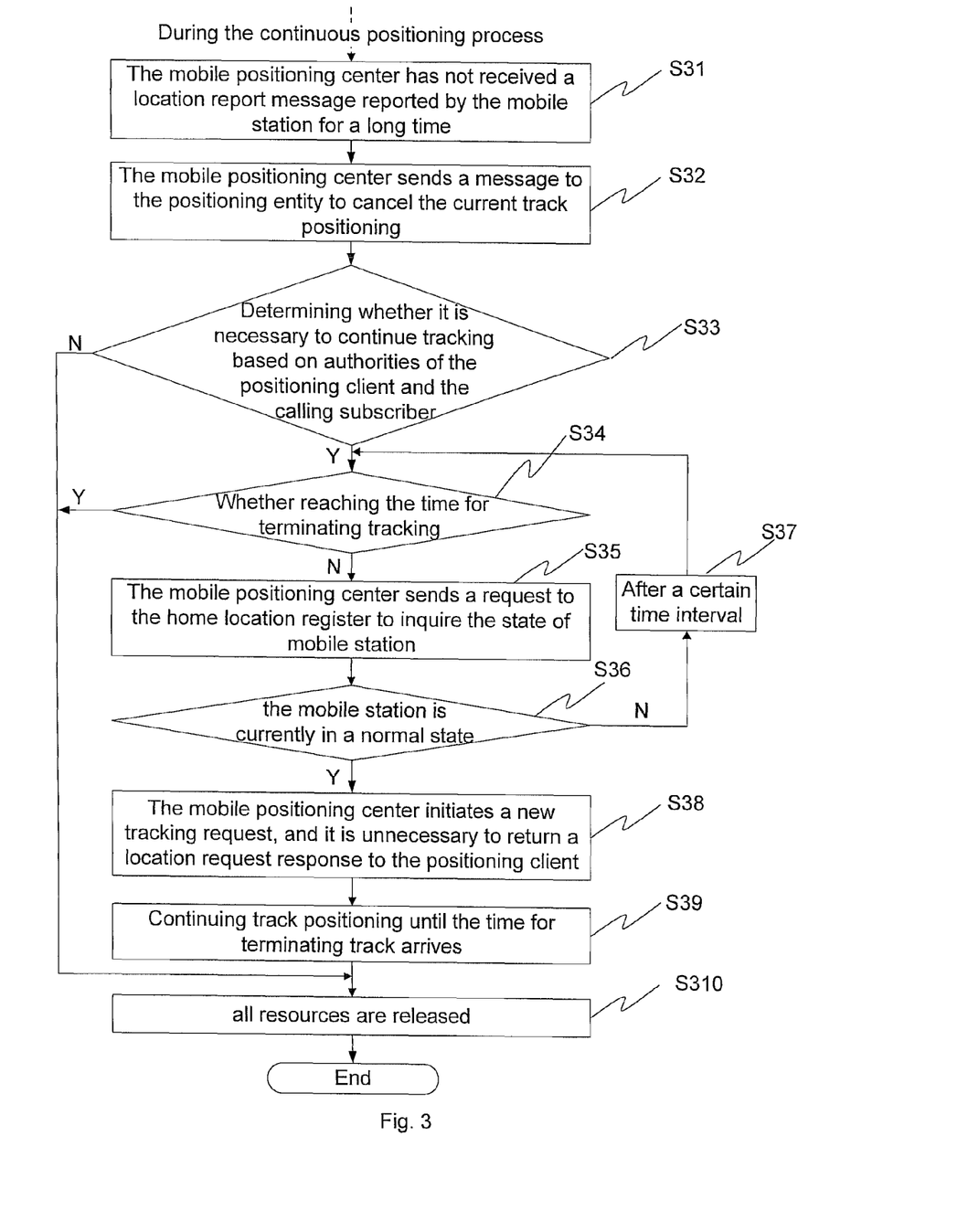
FIG. 3 is a positioning flowchart after power off or restart of a mobile station when track positioning is actively initiated from a network side according to an embodiment of the present invention.

FIG. 3 is a positioning flowchart for improving system performance when track positioning is actively initiated from a network side according to an embodiment, the flow comprises the following steps:

step S31, during the continuous positioning process, the mobile positioning center has not received a location report message reported by the mobile station for a long time;

the basis for the mobile positioning center to determine the long time may be that the time interval from the last time of receiving a location report has reached the predefined maximum time interval or the time has reached several times of the time interval during the continuous positioning;

step S32, the mobile positioning center sends a cancelling geographic location request to the positioning entity, notifies the positioning entity to release resources, and cancels the current track positioning;

step S33, the mobile positioning center determines whether it is necessary to track based on authorities of the positioning client and the calling subscriber; if yes, step S34 is executed, and if not, step S310 is executed;

when the mobile positioning center determines it is necessary to continue performing track positioning, it is necessary to record the start and end time of this continuous positioning, the tracking time interval, the identification of the positioning client which initiates a positioning request, the identification of the calling subscriber which initiates a positioning request, the identification of the mobile station which is tracked and positioned, and the task identification for this continuous positioning.

step S34, the mobile positioning center determines whether the current time reaches the time for terminating tracking, if yes, step S310 is executed, and if not, step S35 is executed;

step S35, the mobile positioning center sends a request to the home location register to inquire the current state of the mobile station;

step S36, the mobile positioning center obtains the current state of the mobile station based on the message returned from the home location register, and if the mobile station is currently in a normal state, step S38 is executed; otherwise step S37 is executed;

step S37, the mobile positioning center executes step S34 after a certain time interval;

step S38, the mobile positioning center initiates a new tracking request, and after a new track positioning is successfully induced, it is unnecessary for the mobile positioning center to return a location request response to the positioning client, and for the positioning client, this new track positioning is invisible;

step S39, the mobile positioning center continues to perform a new track positioning request until the current time reaches the time for terminating the continuous positioning; and step S310, the mobile positioning center releases all positioning resources, and the continuous positioning is over.

Figure 4:
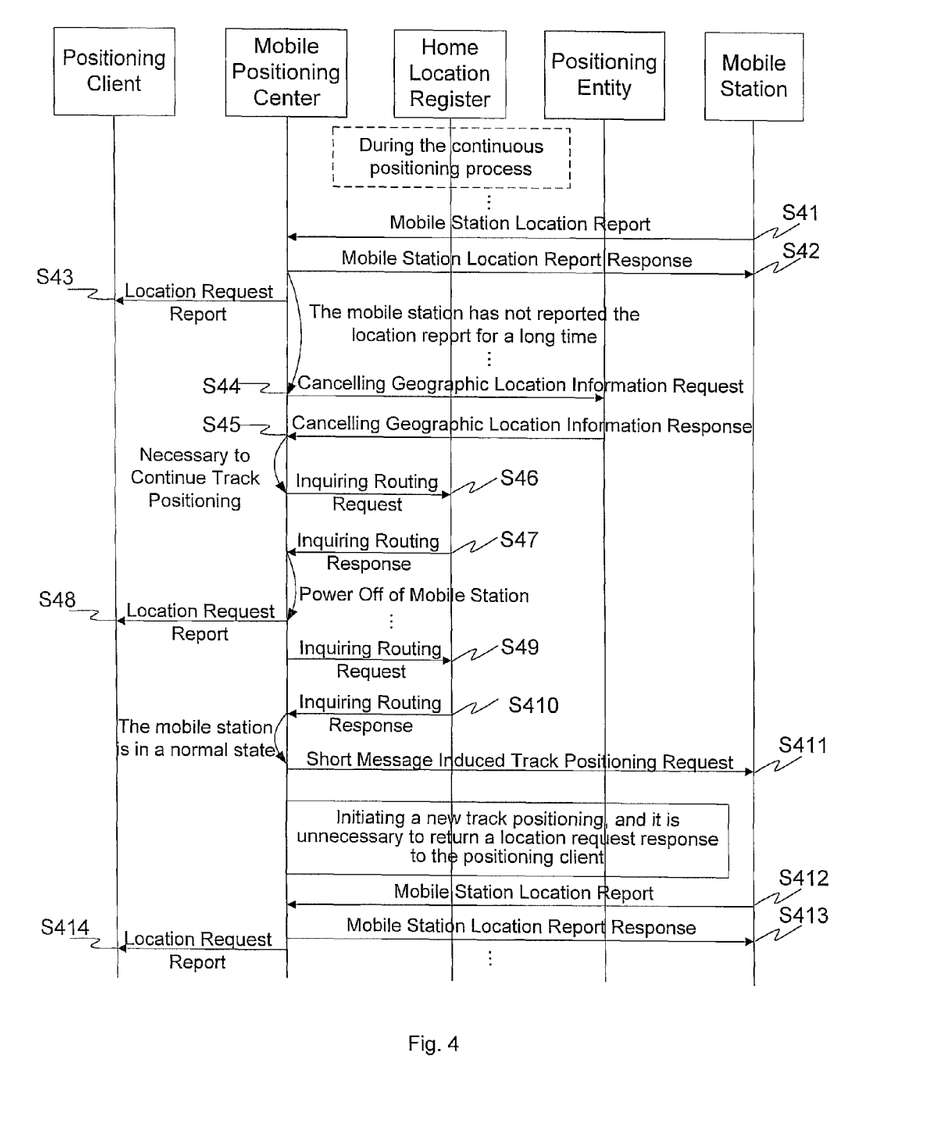
FIG. 4 is a flowchart of an application example after power off or restart of a mobile station when track positioning is actively initiated from a network side according to an embodiment of the present invention.

FIG. 4 is a flowchart of an application example for improving system performance when track positioning is actively initiated from a network side according to an embodiment of the present invention. As shown in FIG. 4, the flow comprises the following steps:

step S41, during the process of track positioning process initiated from the network side, the mobile station reports a location report message to the mobile positioning center, and the message is used for reporting location information or cell/sector information of the mobile station;

step S42, the mobile positioning center returns a location report response to the mobile station;

step S43, the mobile positioning center returns a location request report to the positioning client;

step S44, when the mobile positioning center has not received a location report reported from the mobile station for a long time, the mobile positioning center sends a cancelling geographic location information request to the positioning entity to notify the positioning entity to cancel the previous track positioning;

step S45, the positioning entity returns a cancelling positioning location information response to the mobile positioning center;

step S46, the mobile positioning center determines whether it is necessary to continue performing track positioning based on authorities of the positioning client and the calling subscriber; if not, resources are released and the positioning flow is over, and if yes, an inquiring routing request is sent to the home location register to obtain the current state of the mobile station;

step S47, the home location register returns an inquiring routing response to the mobile positioning center, and the mobile positioning center obtains the current state of the mobile station from the response message, if the mobile station is currently in a normal state, step S411 is executed; and if the mobile station is in a power off state, step S48 is executed;

step S48, the mobile positioning center sends a location request report to the positioning client, the request report indicates failure of this positioning due to power off of the mobile station;

step S49, based on the tracking time interval in this continuous positioning request, the mobile positioning center continues sending an inquiring routing request to the home location register to obtain the current state of the mobile station;

step S410, the home location register returns an inquiring routing response to the mobile positioning center, and the mobile positioning center obtains the current state of the mobile station from the response message, if the mobile station is currently in a normal state, step S411 is executed; and if the mobile station is in an abnormal state, step S48 is executed;

step S411, the mobile positioning center sends a short message induced track positioning request to the mobile station to start a new track positioning, in the short message induced track positioning request, user's consent to positioning is default, thus it is unnecessary to further solicit the mobile station's consent, and the location report time interval in the short message induced track positioning request is still the same as the time interval during the previous continuous positioning;

step S412, the mobile positioning center starts a new track positioning request, and the mobile station reports a location report to the mobile positioning center;

step S413, the mobile positioning center returns a location report response to the mobile station; and step S414, the mobile positioning center returns a location request report to the positioning client.

Figure 5:
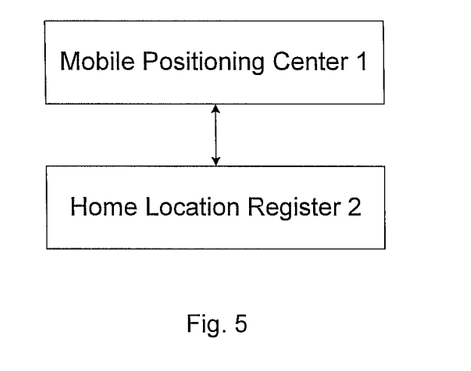
FIG. 5 is a block schematic diagram illustrating a structure of a mobile communication positioning system according to an embodiment of the present invention.

FIG. 5 is a block schematic diagram illustrating a structure of a mobile communication positioning system according to an embodiment of the present invention. As shown in FIG. 5, the mobile communication positioning system according to an embodiment of the present invention comprises: a mobile positioning center 1 and a home location register 2.

The mobile positioning center 1 is used for, during a continuous positioning process, sending a mobile station state inquiring request to the home location register, and performing positioning process or terminating positioning process to the mobile station based on a current state of the mobile station which is included in a mobile station current state response message returned from the home location register.

Preferably, the mobile positioning center 1 is further used for continuing continuous positioning when the current state is normal, and when the current state is at least one of the following states: power off of the mobile station, current inaccessibility of the mobile station, and inability to obtain the current state of the mobile station, resending a notification of inducing a positioning request to the mobile station after the state of the mobile station resumes normal so as to continue a new continuous positioning.

The home location register 2 is used for receiving the inquiring request and returning the mobile station current state response message.

Preferably, the mobile communication positioning system may further comprise a positioning entity (not shown in drawings) for receiving, during the continuous positioning process, a cancelling positioning request from the mobile positioning center when the mobile positioning center fails to obtain a location result reported from the mobile station within a predefined time.

Preferably, the mobile communication positioning system may further comprise: a positioning client (not shown in drawings), and the mobile positioning center 1 is further used for determining whether it is necessary to continue performing track positioning based on authorities of the positioning client and the calling subscriber after sending the cancelling positioning request to the positioning entity, if not, resources are released, the flow is over, and the positioning process to the mobile station is terminated; and if yes, a request is sent to the home location register to inquire the current state of the mobile station.

According to the present invention, addition of a flow during the continuous positioning process actively initiated from the network side can, on the one hand, improve the resource utilization rate during track-type continuous positioning process at the network side, and on the other hand, can guarantee that the positioning client can timely obtain the currently latest location of the mobile station under special circumstances.

Of course, the present invention may have other various kinds of embodiments. Under the condition of not departing from the spirit and essence of the present invention, those technicians skilled in the art may make various corresponding changes and alterations based on the present invention, but such corresponding changes and alterations shall fall within the scope of the appended claims.

What is claimed is:

1. A method for improving performance of a positioning system during a continuous positioning process, which is applied in a mobile communication positioning system comprising a mobile positioning center, a home location register, and a mobile station, comprising:

during the continuous positioning process, the mobile positioning center sending a mobile station state inquiring request to the home location register;

the home location register receiving the inquiring request and returning a mobile station current state response message; and the mobile positioning center performing positioning process or terminating positioning process to the mobile station based on the current state of the mobile station;

wherein the current state comprises a normal state and an abnormal state, the abnormal state at least comprises one of the following states: power off of the mobile station, current inaccessibility of the mobile station, and inability to obtain a current state of the mobile station;

wherein when the current state is normal, the continuous positioning is continued; when the current state is at least one of the following states: power off of the mobile station, current inaccessibility of the mobile station, and inability to obtain a current state of the mobile station, the mobile positioning center resends a notification of inducing a positioning request to the mobile station so as to continue a new continuous positioning after the state of the mobile station resumes normal.

2. The method for improving performance of a positioning system during a continuous positioning process according to claim 1, wherein the mobile positioning center resends a notification of inducing a positioning request to the mobile station in at least one of the following manners: sending a short message and sending a WAP PUSH message.

3. The method for improving performance of a positioning system during a continuous positioning process according to claim 1, wherein the mobile communication positioning system further comprises a positioning entity, and during the continuous positioning process, when the mobile positioning center does not obtain a location result reported from the mobile station within a predefined time, the mobile positioning center terminates previous continuous positioning and sends a cancelling positioning request to the positioning entity.

4. The method for improving performance of a positioning system during a continuous positioning process according to claim 3, wherein the mobile communication positioning system further comprises a positioning client, and after the mobile positioning center sends the canceling positioning request to the positioning entity, the mobile positioning center determines whether it is necessary to continue performing track positioning based on authorities of the positioning client and a calling subscriber, wherein if it is not necessary, the resources are released, the flow is over, and the positioning process to the mobile station is terminated; and wherein it is necessary, a request is sent to the home location register to inquire the current state of the mobile station.

5. The method for improving performance of a positioning system during a continuous positioning process according to claim 4, wherein if the mobile positioning center determines it is necessary to continue performing track positioning based on authorities of the positioning client and the calling subscriber, a task identification for this continuous positioning must be recorded.

6. The method for improving performance of a positioning system during a continuous positioning process according to claim 5, wherein if it is necessary to continue performing track positioning, start and end time of this continuous positioning, a tracking time interval, an identification of the positioning client which initiates a positioning request, an identification of the calling subscriber which initiates a positioning request, and an identification of the mobile station which is tracked and positioned are further recorded.

7. The method for improving performance of a positioning system during a continuous positioning process according to claim 6, wherein when the mobile station is in an abnormal state, the mobile positioning center needs to report a positioning result to the positioning client based on the tracking time interval in this continuous positioning request, and the reported result comprises the task identification for the continuous positioning.

8. A mobile communication positioning system, comprising:
    a mobile positioning center, which, during a continuous positioning process, sends a mobile station state inquiring request to a home location register, and performs positioning process or terminates positioning process to a mobile station based on a current state of the mobile station which is included in a mobile station current state response message returned from the home location register;
    the home location register, which receives the inquiring request and returns the mobile station current state response message;
    wherein the mobile positioning center is further used for continuing the continuous positioning when the current state is normal, and when the current state is at least one of the following states: power off of the mobile station, current inaccessibility of the mobile station, and inability to obtain the current state of the mobile station, resending a notification of inducing a positioning request to the mobile station after the state of the mobile station state resumes normal so as to continue a new continuous positioning.

9. The mobile communication positioning system according to claim 8, further comprising:
    a positioning entity, which, during the continuous positioning process, receives a. cancelling positioning request from the mobile positioning center when the mobile positioning center does not obtain a location result reported from the mobile station within a predefined time.

10. The mobile communication positioning system according to claim 9, further comprising a positioning client; and
    the mobile positioning center, after the canceling positioning request is sent to the positioning entity, determines whether it is necessary to continue performing track positioning based on authorities of the positioning client and a calling subscriber, wherein if it is not necessary, the resources are released, the flow is over, and the positioning process to the mobile station is terminated; and wherein it is necessary, a request is sent to the home location register to inquire the current state of the mobile station.

* * * * *